(12) United States Patent
Yamauchi

(10) Patent No.: US 7,043,226 B2
(45) Date of Patent: May 9, 2006

(54) VARIABLE EXPIRATION PARAMETER OF A WIRELESS COMMUNICATION DEVICE BASED UPON SIGNAL STRENGTH

(75) Inventor: Toshiaki Yamauchi, Tokyo (JP)

(73) Assignee: Motorola, Inc., Schaumburg, IL (US)

( * ) Notice: Subject to any disclaimer, the term of this patent is extended or adjusted under 35 U.S.C. 154(b) by 63 days.

(21) Appl. No.: 10/738,861

(22) Filed: Dec. 17, 2003

(65) Prior Publication Data

US 2005/0136925 A1   Jun. 23, 2005

(51) Int. Cl.
*H04M 11/00* (2006.01)

(52) U.S. Cl. .................. 455/405; 455/512; 455/513; 455/453; 455/452.2; 455/67.11; 455/115.3; 455/115.1

(58) Field of Classification Search ............... 455/405, 455/423, 424, 425, 452.2, 453, 513, 115.1, 455/115.3, 67.11, 512, 409, 406
See application file for complete search history.

(56) References Cited

U.S. PATENT DOCUMENTS

| | | | | |
|---|---|---|---|---|
| 5,267,261 | A * | 11/1993 | Blakeney et al. | 370/332 |
| 6,021,125 | A * | 2/2000 | Sakoda et al. | 370/345 |
| 6,577,608 | B1 * | 6/2003 | Moon et al. | 370/311 |
| 6,600,934 | B1 * | 7/2003 | Yun et al. | 455/562.1 |
| 6,693,915 | B1 * | 2/2004 | Lappetelainen et al. | 370/468 |
| 2001/0018346 | A1 * | 8/2001 | Okajima et al. | 455/437 |
| 2002/0147019 | A1 * | 10/2002 | Uhlik et al. | 455/452 |
| 2003/0003868 | A1 * | 1/2003 | Juurikko | 455/41 |
| 2003/0096612 | A1 * | 5/2003 | Kim et al. | 455/435 |

(Continued)

FOREIGN PATENT DOCUMENTS

JP    2002271341 A  *  9/2002

OTHER PUBLICATIONS

J. Rosenberg, H. Schulzrinne, G. Camarillo, A. Johnston, J. Peterson, R. Sparks, M. Handley, E. Schooler, "SIP: Session Initiation Protocol", Network Working Group Standards Track, Jun. 2002, 269 pages.

*Primary Examiner*—Sonny Trinh
*Assistant Examiner*—Huy Phan
(74) *Attorney, Agent, or Firm*—Joseph T. Cygan

(57) ABSTRACT

A method (300) and an apparatus (800) for determining duration of authorized usage time period are disclosed. A wireless mobile communication device (112) receives (304) a signal, measures (306) signal strength of the signal, determines (308) the duration of authorized usage time period based upon the measured signal strength, and requests (310) registration for the duration of authorized usage time period. A method (900) and a system (1300) for registering a wireless mobile communication device (112) in a wireless local area network (102) for a variable duration based upon wireless signal strength information are also disclosed. The wireless local area network (102) receives (902) a signal (116) including a registration request and an identification of the wireless mobile communication device (112), measures (906) signal strength of the signal, registers (908) the identification of the source of the signal, determines (910) duration of the authorized usage time period based upon the signal strength, assigns (912) the duration of authorized usage time period to the identification of the source of the signal, and un-registers (914) the identification of the source of the signal from the registration upon expiration of the duration of authorized usage time period.

25 Claims, 12 Drawing Sheets

U.S. PATENT DOCUMENTS

| | | | |
|---|---|---|---|
| 2004/0008688 A1* | 1/2004 | Matsubara et al. | 370/395.21 |
| 2004/0153667 A1* | 8/2004 | Kastelewicz et al. | 713/201 |
| 2004/0156320 A1* | 8/2004 | Hammer et al. | 370/252 |
| 2004/0205209 A1* | 10/2004 | Wengrovitz et al. | 709/230 |
| 2004/0255302 A1* | 12/2004 | Trossen | 719/318 |
| 2005/0026642 A1* | 2/2005 | Lee et al. | 455/522 |
| 2005/0063408 A1* | 3/2005 | Famolari | 370/431 |
| 2005/0096053 A1* | 5/2005 | Liu et al. | 455/439 |

* cited by examiner

| SIGNAL STRENGTH S (dBm) | DURATION (SEC) |
|---|---|
| S>−70 | 3600 |
| −70≥S>−80 | 3000 |
| −80≥S>−90 | 2400 |
| −90≥S>−100 | 1800 |
| −100≥S>−110 | 1200 |
| −110≥S>−120 | 600 |
| −120 S | 0 |

112

VARIABLE EXPIRATION PARAMETER OF A WIRELESS COMMUNICATION DEVICE BASED UPON SIGNAL STRENGTH

FIELD OF THE INVENTION

The present invention generally relates to a method and a system for registering a wireless communication device in a network, more specifically to a method and a system for registering a wireless communication device in a wireless local area network for a variable duration based upon wireless signal strength information.

BACKGROUND OF THE INVENTION

For an Internet communication system such as Voice Over IP ("VoIP") and an instant messaging system, Session Initiation Protocol ("SIP"), such as a protocol describe in the Request for Comments 3261 ("RFC 3261") by The Internet Society in The Internet Engineering Task Force, which is herein incorporated by reference, is generally used as a signaling protocol of an application layer level for establishing, maintaining, and terminating a multi-media session. A communication device in a system using SIP communicates location information such as an IP address of the communication device by transmitting a REGISTER request to a register server of the system. A REGISTER message, in addition to the location information of the communication device, can include time information such as an "expires" parameter. For example, the expires parameter can limit a use of the communication device in the system and allow operating in the system only during an allowed period such as a normal work period from 9:00 AM to 5:00 PM, or a specific duration such as one hour. A user may register a plurality of location information, such as several IP addresses which the user can use in the system and may request the system to search all of the plurality of location information until one is found, indicating the user is present at one of the IP addresses. The registration of the communication device may be revoked or expired during the allowed period by transmitting a predetermined parameter to the system.

For a wireless local area network ("WLAN") system 100 of FIG. 1, a WLAN coverage area 102 is served by a base station 104, or an access point, which is connected to a network 106, which is a land-line network. The WLAN system 100 further comprises a register server 108, which is also connected to the network 106, and a location server 110, which is connected to the register server 108. In this example, the register server 108 functions also as a SIP proxy server defined in SIP. A proxy server assists in various aspects of SIP communication handling such as routing requests to a user's current location, authenticating and authorizing users for services, implementing provider call-routing policies, and providing features to users. When a wireless mobile communication device 112 detects a wireless signal 114 from the base station 104, the wireless mobile communication device 112 communicates with the base station 104 wirelessly, and transmits a REGISTER message 116 to the base station 104. The base station 104 then communicates the REGISTER message 116 received from the wireless mobile communication device 112 to the register server 108 through the network 106. The register server 108 interprets the REGISTER message, and associates the location information, i.e. IP address, of the wireless mobile communication device 112 to a SIP address such as a Uniform Resource Identifier ("URI") of a machine into which the wireless mobile communication device 112 is currently logged. The register server 108 then registers the location information of the wireless mobile communication device 112 to the location server 110.

When making a telephone call using SIP, the wireless mobile communication device 112 transmits an INVITE request, which includes location information of a target user or device, to the base station 104 which forwards the INVITE request to the register server 108. The register server 108 then searches for identified in the INVITE request based on registered information. SIP can also provide a presence service, which notifies users of a status, active or inactive, of a particular user based upon the registered information.

In a system supporting a specific length for the expires parameter upon registering, a registered communication device, wired or wireless, needs to periodically transmit a REGISTER message before the expires parameter expires in order to remain active in the system beyond the initially granted allowed time period. For example, if the system sets the expires parameter to be one hour upon registration, then the communication device needs to transmit a REGISTER message before the end of the one hour if the communication device is to be active beyond the initial one hour period. The registered information such as location information becomes invalid at the expiration of the expires period. However, as shown in FIG. 2, if the wireless mobile communication device 112, which is registered in the system, leaves a coverage area 102 supported by the base station 104 during an expires period, the registered location information of the wireless mobile communication device 112 is still considered to be valid by the system because the expires period has not expired. Therefore, the system will assume that the wireless mobile communication device 112 is still active in the system or is within the coverage area 102, and will provide valid presence information of the wireless mobile communication device 112 even though the wireless mobile communication device 112 cannot be reached. Further, because the wireless mobile communication device 112 is out of the coverage area 102, the wireless mobile communication device 112 is unable to notify the system that the system needs to un-register the wireless mobile communication device 112. If another communication device attempts to call the wireless communication device, which is beyond the coverage area but still has registered location information, the system will find valid location information, i.e. the IP address, of the wireless mobile communication device 112 and will attempt to complete the call. Because the system goes through all steps for establishing a call to the wireless mobile communication device 112 that is not reachable, it takes time for the system to time out the call, and a response to the communication device originating the call is not immediate.

DETAILED DESCRIPTION OF THE PREFERRED EMBODIMENTS

The present invention relates a method and a system for registering a wireless mobile communication device in a wireless local area network ("WLAN") for a variable duration based upon wireless signal strength information. Instead of providing a fixed duration of authorized usage in a WLAN to all wireless mobile communication devices upon registration, the present invention evaluates signal strength of a wireless mobile communication device upon registration. If the signal strength is high enough, for example the signal strength exceed a certain threshold such as −80 dBm, so that the wireless mobile communication device is highly likely to be well within a coverage area of the WLAN, the system authorizes the wireless mobile communication device to operate in the WLAN for a predetermined duration such as one hour. However, if the signal strength is very weak, for example the wireless mobile communication device is at a fringe area of the coverage and the signal strength is at a sensitivity limit of the WLAN or a lower threshold, such as −120 dBm, then the system may not allow the wireless mobile communication device to register. The system may further re-measure the signal strength of the wireless mobile communication device during a previously assigned authorized period. If the re-measured signal strength is weaker that the previously measured signal strength, then the system may reduce the authorized period or may even un-register the wireless mobile communication device from the system based upon the re-measured signal strength.

Figure 1:
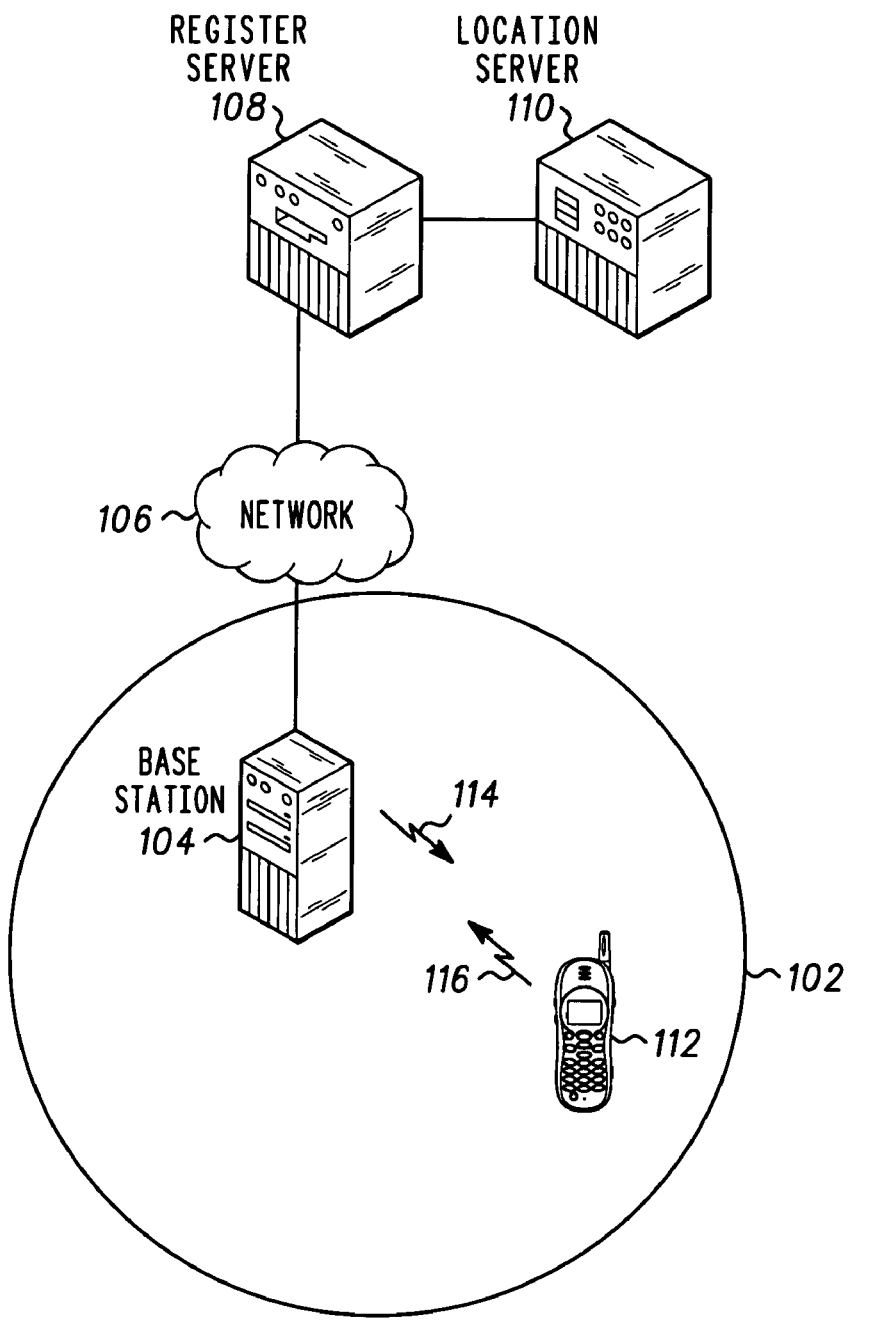
FIG. 1 is an exemplary block diagram of an environment where the prior art may be practiced.
Figure 2:
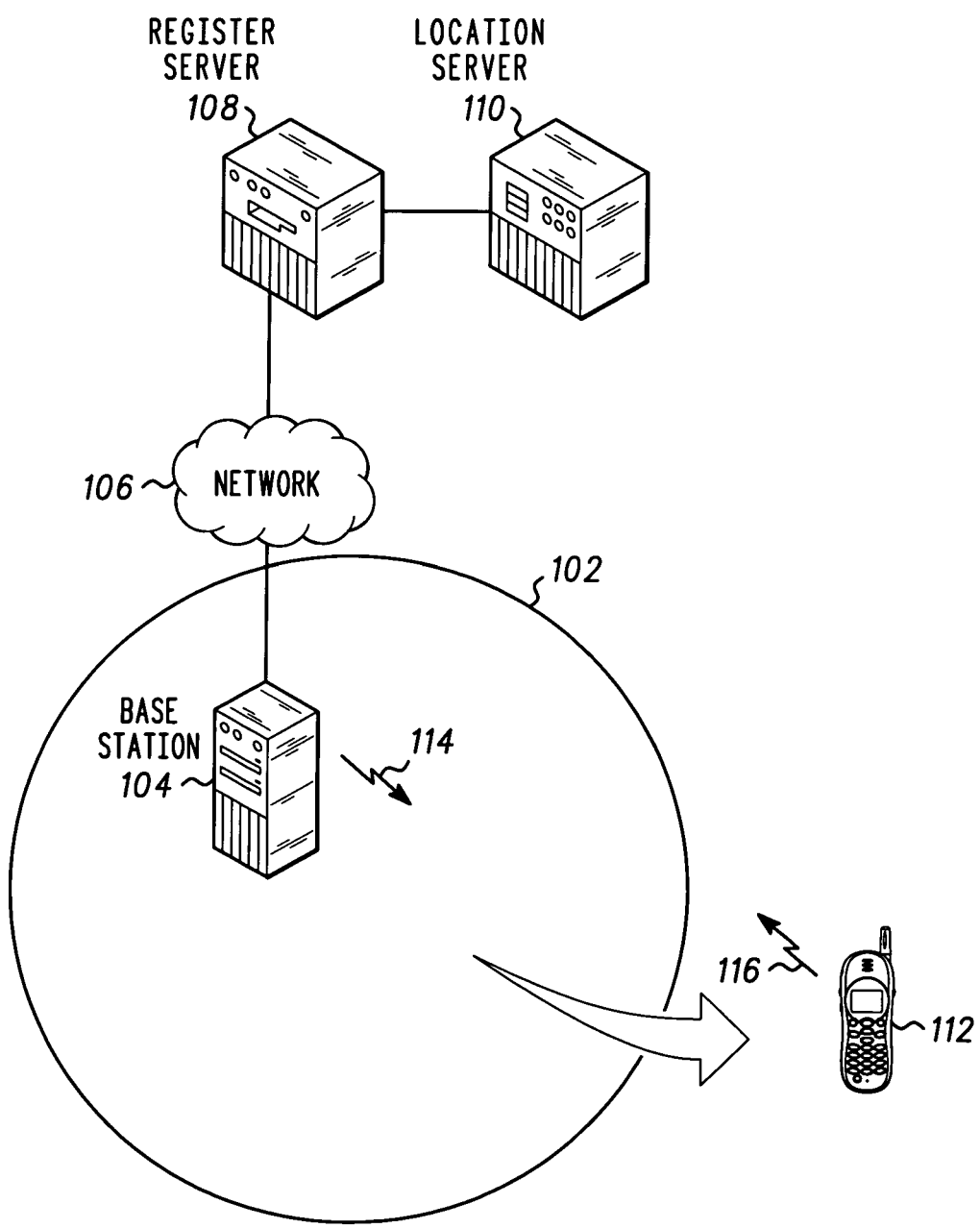
FIG. 2 is an exemplary block diagram of an environment where the prior art may experience difficulty.
Figure 3:
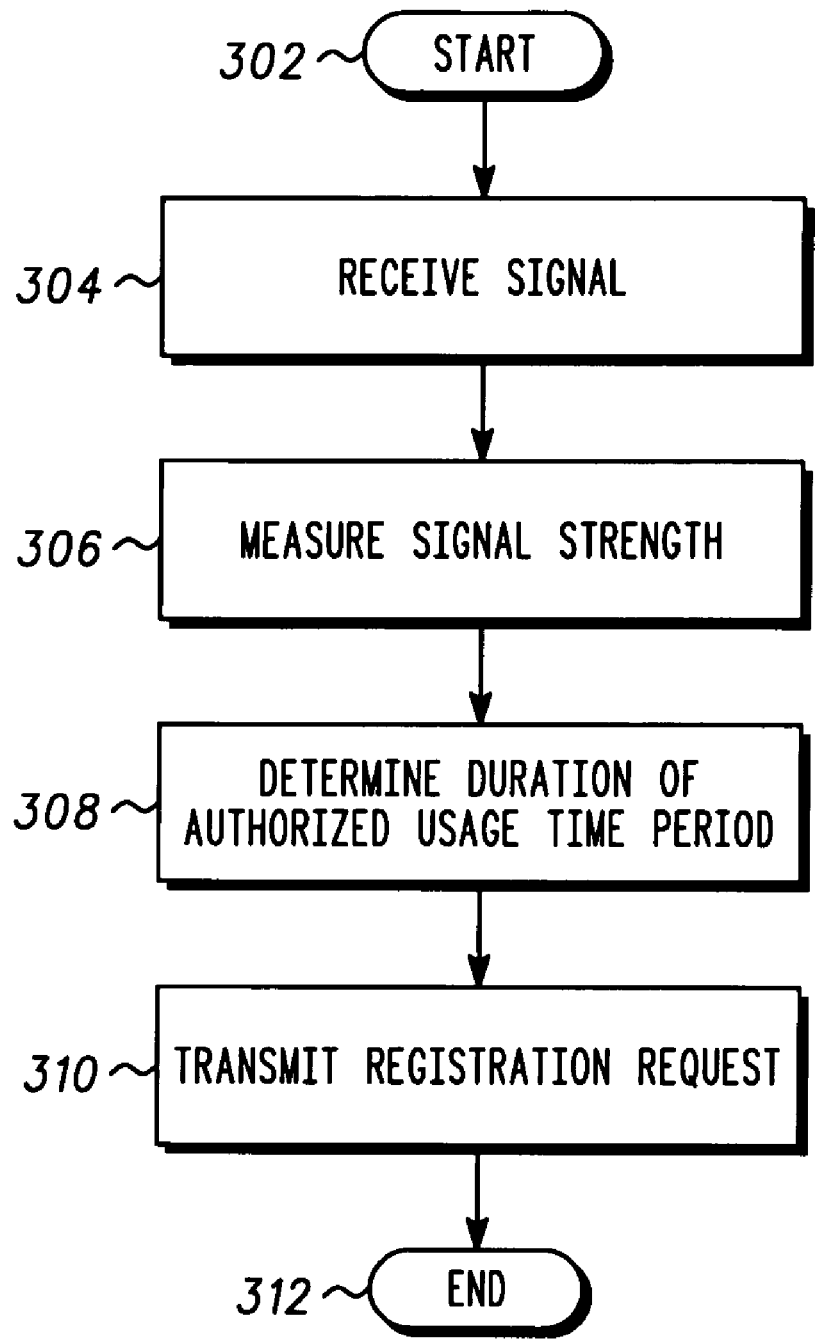
FIG. 3 is an exemplary flowchart of for determining duration of authorized usage time period in a wireless mobile communication device in accordance with the present invention.

FIG. 3 is an exemplary flowchart 300 for determining duration of authorized usage time period in a wireless mobile communication device in accordance with the present invention. Devices and descriptions illustrated in FIG. 1 and FIG. 2 will be referenced to illustrate the flowchart process. An authorized usage time period includes an expires period as used in SIP. The process begins in block 302. In block 304, the wireless mobile communication device 112 receives a signal 114 from the base station 104. The wireless mobile communication device 112 then measures signal strength of the signal 114 in block 306, and determines the duration of authorized usage time period based upon the measured signal strength in block 308. Once the duration has been determined, the wireless mobile communication device 112 transmits a request to be registered in the WLAN 102 for the duration of authorized usage time period in block 310, and the process terminates in block 312.

Figures 4, 5:
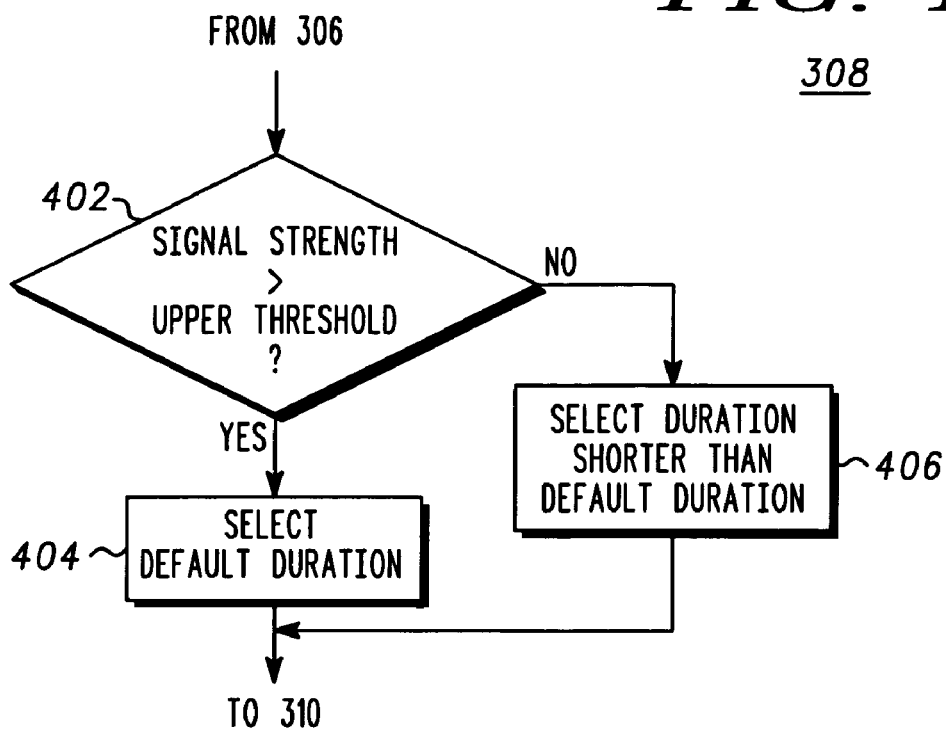
FIG. 4 is an exemplary flowchart further describing determination of the duration of authorized usage time period base upon the signal strength.
FIG. 5 is an exemplary table utilized in determining the duration of authorized usage time period base upon the signal strength.

FIG. 4 is an exemplary flowchart further describing block 308 for determining the duration of authorized usage time period base upon the signal strength. In block 402, the measured signal strength is compared to an upper threshold such as −70 dBm. If the measured signal strength exceeds the upper threshold, then the wireless mobile communication device 112 is likely to be well within the coverage area 202, and a default time period, such as 3600 seconds, is selected in block 404. If the measured signal strength fails to exceed the upper threshold, then the duration of authorized usage time period is reduced from the default time period in block 406. Further, if the measured signal strength is below a lower threshold, then the duration of authorized usage time period may be set to zero and the wireless mobile communication device 112 is not registered. The duration of the authorized usage time period can be determined in various ways. For example, a lookup table 500 as shown in FIG. 5 may be used to determine the duration of authorized usage time period shown in column 502 based upon the measured signal strength range shown in column 504. Alternatively, the duration of the authorized usage time, t, may be mathematically calculated as shown below in Equation (1).

$$t = \begin{cases} t_{default}, s \geq L_{UP} \\ 0, s < L_{LOW} \\ s \cdot \dfrac{t_{default}}{L_{UP} - L_{LOW}} \end{cases} \quad (1)$$

where s is the measured signal strength of the signal, $t_{default}$ is the default time period of authorized usage, $L_{UP}$ is the upper threshold, and $L_{LOW}$ is the lower threshold.

Figure 6:
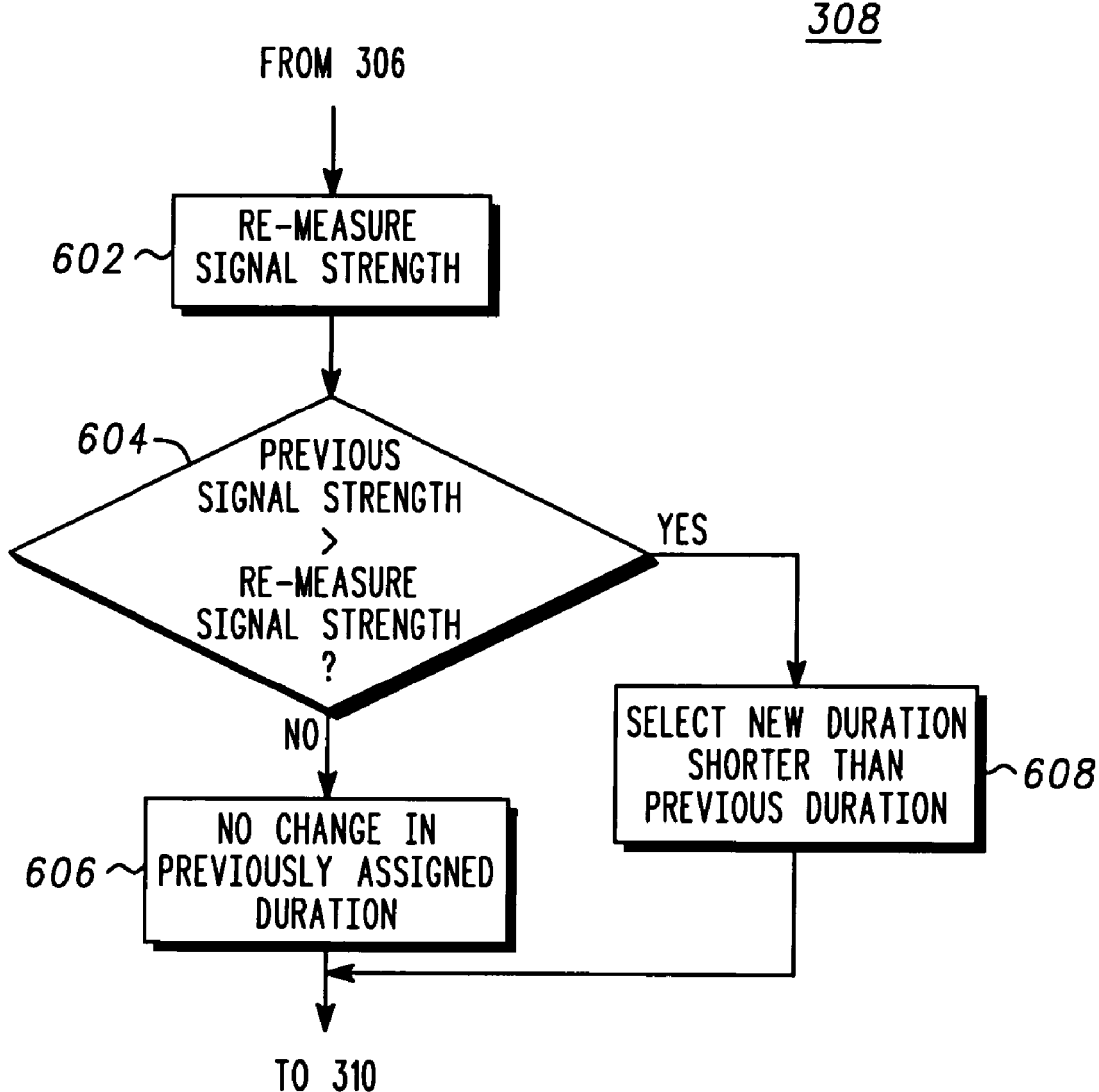
FIG. 6 is an exemplary flowchart describing re-determination of the duration of authorized usage time period base upon the re-measured signal strength.

The signal strength may also be re-measured during a previously authorized usage period. The signal strength may be re-measured at predetermined time interval such as every ten seconds, or may be re-measured continuously. Based upon the re-measured signal strength, a new duration of the authorized usage time period may be determined. FIG. 6 is an exemplary flowchart describing re-determination of the duration of authorized usage time period base upon the re-measured signal strength. During the duration of authorized period, the wireless mobile communication device 112 re-measures the signal strength of the signal 114 in block 602, and compares the re-measured signal strength to the previously measured signal strength in block 604. If the re-measured signal strength is not weaker than the previously measured signal strength, then the previously duration of the authorized usage time period is unchanged in block 606. However if the re-measured signal strength is weaker than the previously measured signal strength, then in block 608, the wireless mobile communication device 112 transmits a new registration request with a new duration of authorized usage period. There may be a minimum required difference in the signal strength, such as 10 dB, to prevent the wireless mobile communication device 112 from transmitting a new registration request for a small signal strength difference between the re-measured signal strength and the previously measured signal strength. For example, if the wireless mobile communication device 112 is initially registered for the default time period as the authorized usage time period, but before the expiration of the default time period, a re-measured signal strength is weak enough to indicate that the wireless mobile communication device 112 is now in a fringe area of the coverage area, then the wireless mobile communication device 112 may transmit a new registration request with a new and reduced duration of the authorized usage time period based upon the re-measured signal strength. Further, based upon the re-measured signal strength alone or based upon a difference between the re-measured signal strength and a previously measured signal strength, the authorized usage time period may be ended.

Figure 7:
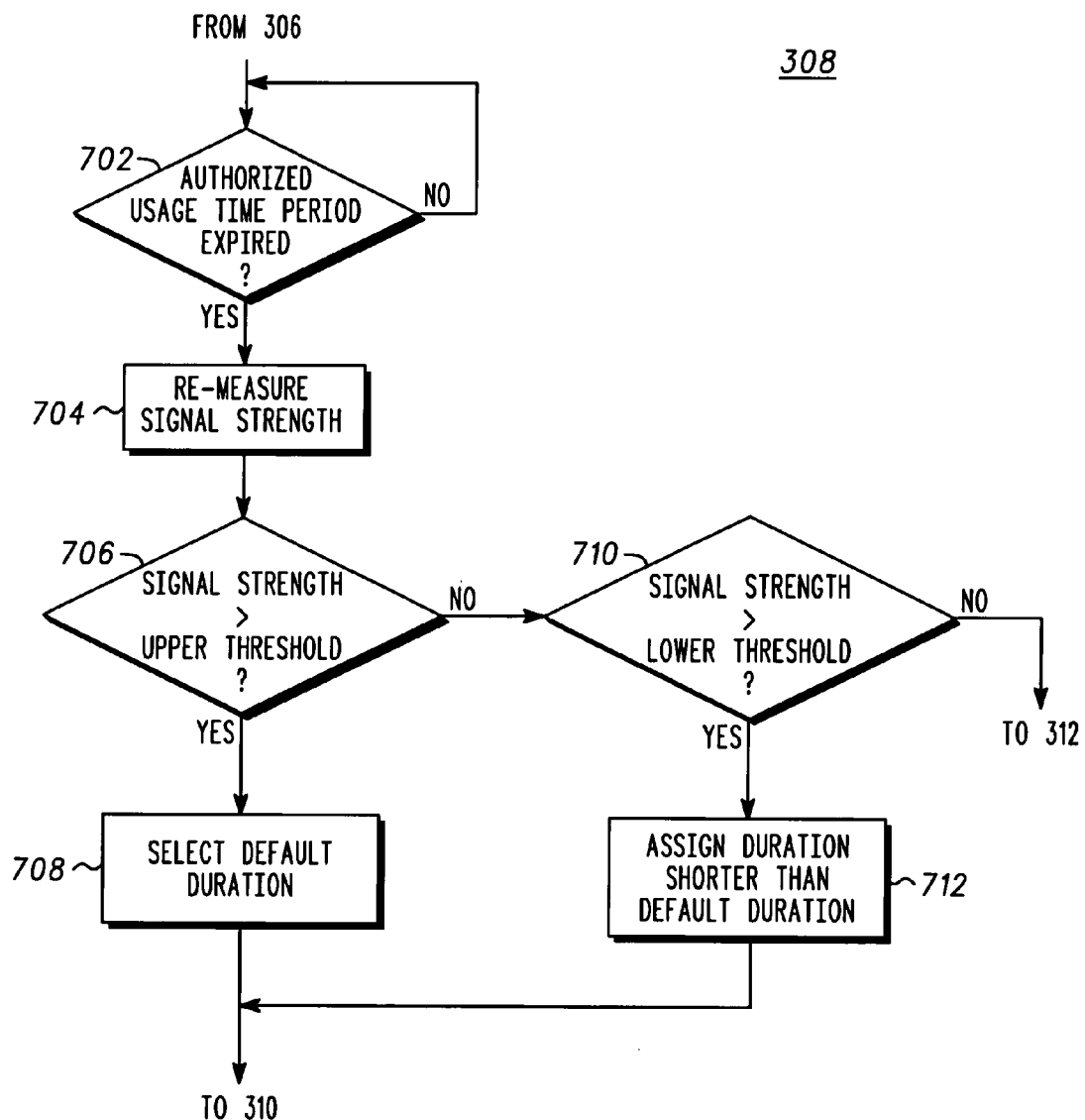
FIG. 7 is an exemplary flowchart describing re-determination of the duration of authorized usage time period base upon the re-measured signal strength upon expiration of a previous authorized usage time period.

The signal strength may also be re-measured upon expiration of the current authorized usage time period as shown in FIG. 7. In block 702, the wireless mobile communication device 112 determines whether the current authorized usage time period has expired. If the current authorized usage time period has expired, then the wireless mobile communication device 112 may re-measure the signal strength of the signal 114 in block 704, and may compare to the upper threshold in block 706. If the re-measured signal strength exceeds the upper threshold, then the default time period may again be selected in block 708. If the re-measured signal strength fails to exceed the upper threshold, then the re-measured signal strength is compared to the lower threshold in block 710. If the re-measured signal strength exceeds the lower threshold, the duration of authorized usage time period is reduced from the default time period in block 712. However, if the measured signal strength fails to exceed the lower threshold, then the wireless mobile communication device 112 does not transmit a request for re-registration. To avoid abruptly terminating a call already in progress, the wireless mobile communication device 112 may also transmit an expiration delay request upon the expiration of the authorized usage time period.

Figure 8:
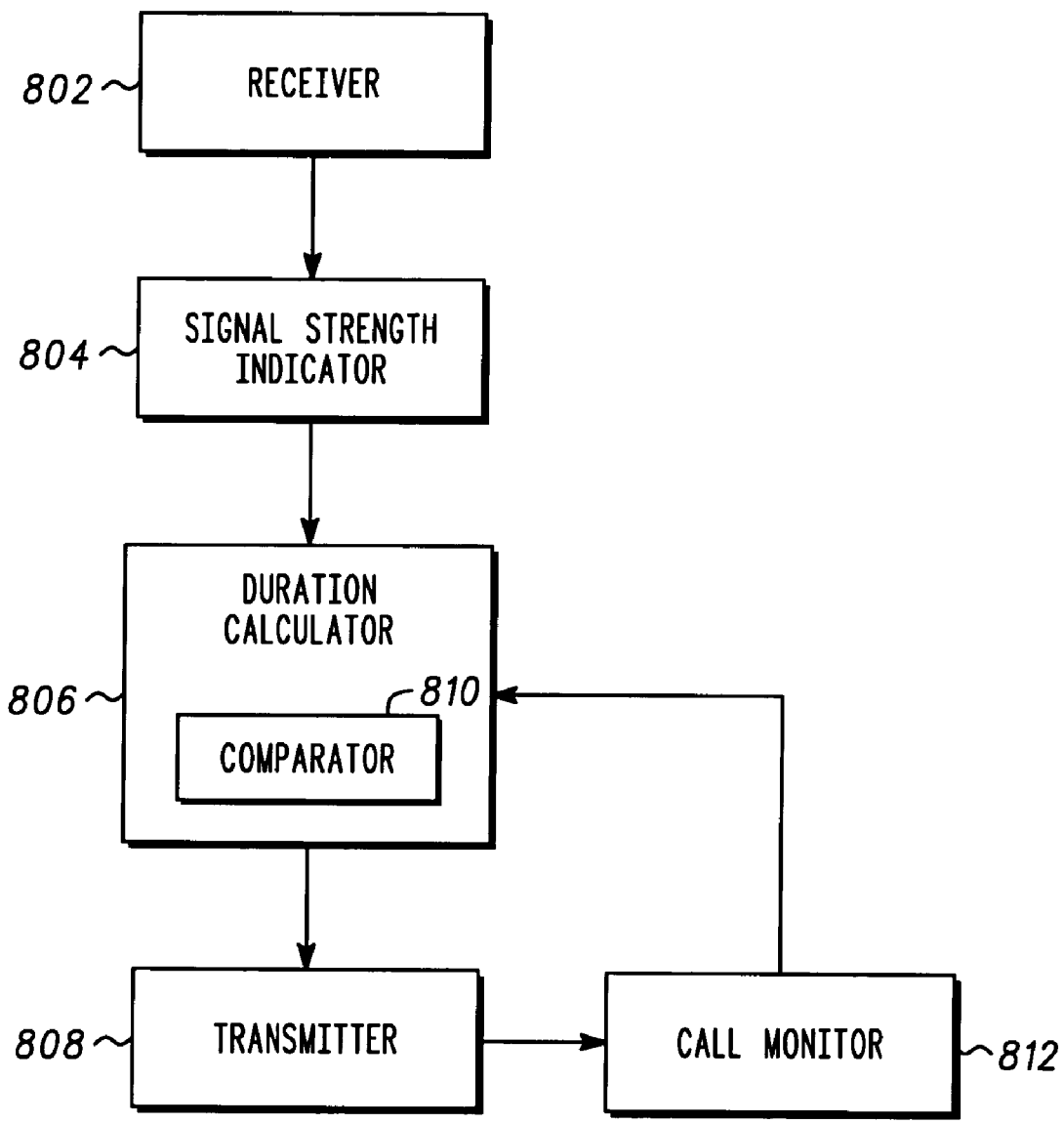
FIG. 8 is an exemplary block diagram of a wireless mobile communication device in accordance with the present invention.

FIG. 8 is an exemplary block diagram of a wireless mobile communication device 112 in accordance with the present invention. The wireless mobile communication device 112 is configured to determine duration of authorized usage time period, and comprises a receiver 802, which is configured to receive a signal. A signal strength indicator 804, which is configured to measure signal strength of the signal, is coupled to the receiver 802. A duration calculator 806 is coupled to the signal strength indicator 804, and is configured to determine the duration of authorized usage time period based upon the measured signal strength. A transmitter 808, which is coupled to the duration calculator 806, is configured to transmit a registration request that allows the wireless mobile communication device 112 to be registered for the duration of authorized usage time period. The duration calculator may further comprise a comparator 810, which is configured to compare the measured signal strength to a predetermined upper threshold, coupled to the signal strength indicator 804. The duration calculator 806 is then further configured to determine the duration of authorized usage time period based upon the output of the comparator 810. For example, the duration calculator 806 sets a predetermined default time period as the duration of authorized usage time period if the comparator 810 determines that the measured signal strength exceeds the predetermined upper threshold. If the comparator 810 determines that the measured signal strength fails to exceed the predetermined upper threshold, then the duration calculator 806 reduces the duration of authorized usage time period to less than the predetermined default time period.

The wireless mobile communication device 112 may further comprise a call monitor 812, which is coupled to the duration calculator 806 and to the transmitter 808. The call monitor 812 is configured to determine whether the wireless mobile communication device 112 is in a call upon expiration of the duration of authorized usage time period. The transmitter 808 is then further configured to transmit an expiration delay request designed to delay the expiration of the duration of authorized usage time period until the call is terminated if the wireless mobile communication device 112 is in a call.

Figure 9:
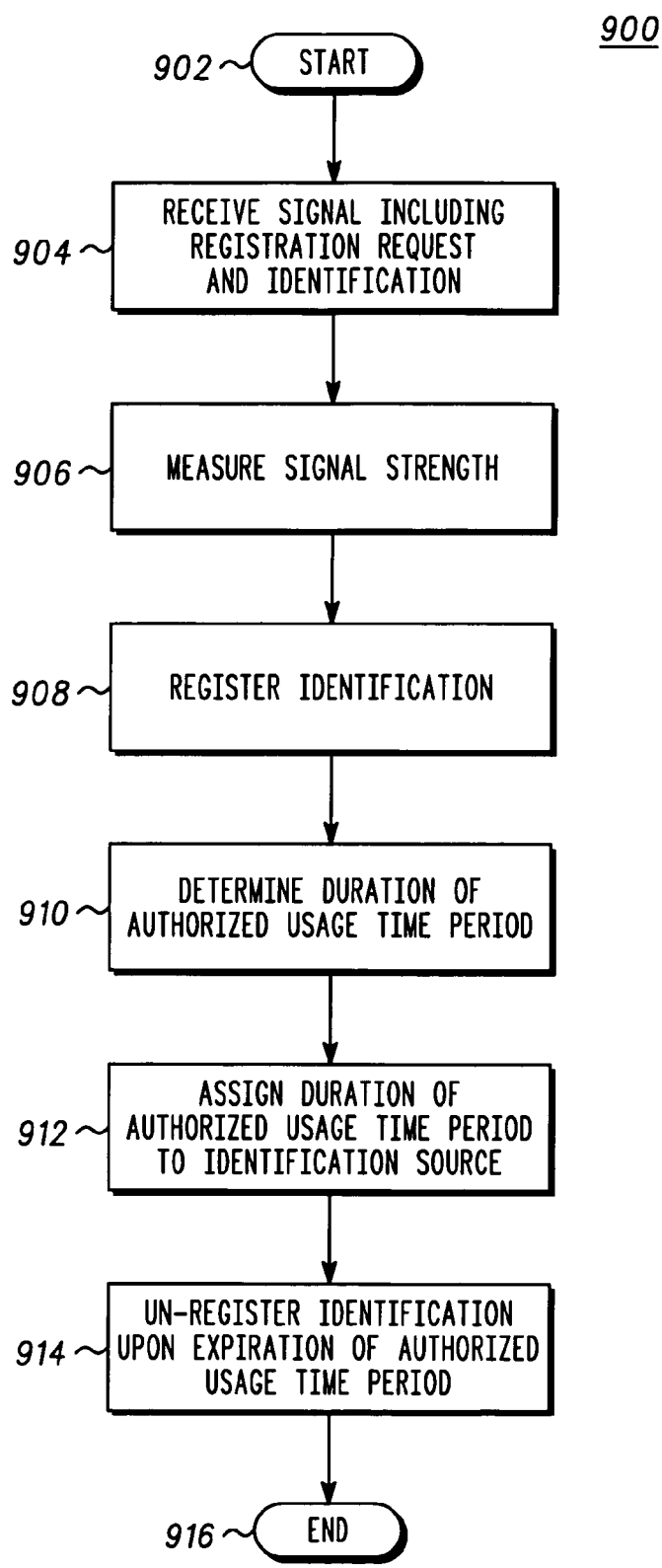
FIG. 9 is an exemplary flowchart for assigning an authorized usage time period in accordance with the present invention.

FIG. 9 is an exemplary flowchart 900 for assigning an authorized usage time period in accordance with the present invention. The process begins in block 902. The WLAN 102 receives the signal 116 including a registration request and an identification of a source of the signal in block 904. In this example, a base station 104 as a component of the WLAN receives the signal 116, and the source of the signal 116 is a wireless mobile communication device 112. The WLAN 102 then measures signal strength of the signal 116 in block 906. The WLAN 102 also registers the identification, such as an IP address, of the wireless mobile communication device 112 in block 908, and determines duration of the authorized usage time period based upon the signal strength in block 910. Alternatively, the wireless mobile communication device 112 may measure signal strength of a signal 114 transmitted by the base, and transmit back to the base station 112 signal strength information, which can be used to determine duration of the authorized usage time period in block 910.

In block 912, the WLAN 102 assigns the duration of authorized usage time period to the registered identification, i.e., the IP address of the wireless mobile communication device 112, effectively authorizing the wireless mobile communication device 112 to operate in the WLAN 102 for the duration of the authorized usage time period. Upon expiration of the duration of authorized usage time period, the WLAN 102 un-registers the identification, or the IP address, of the wireless mobile communication device 112 from the registration in block 914, and the process terminates in block 916.

Figure 10:
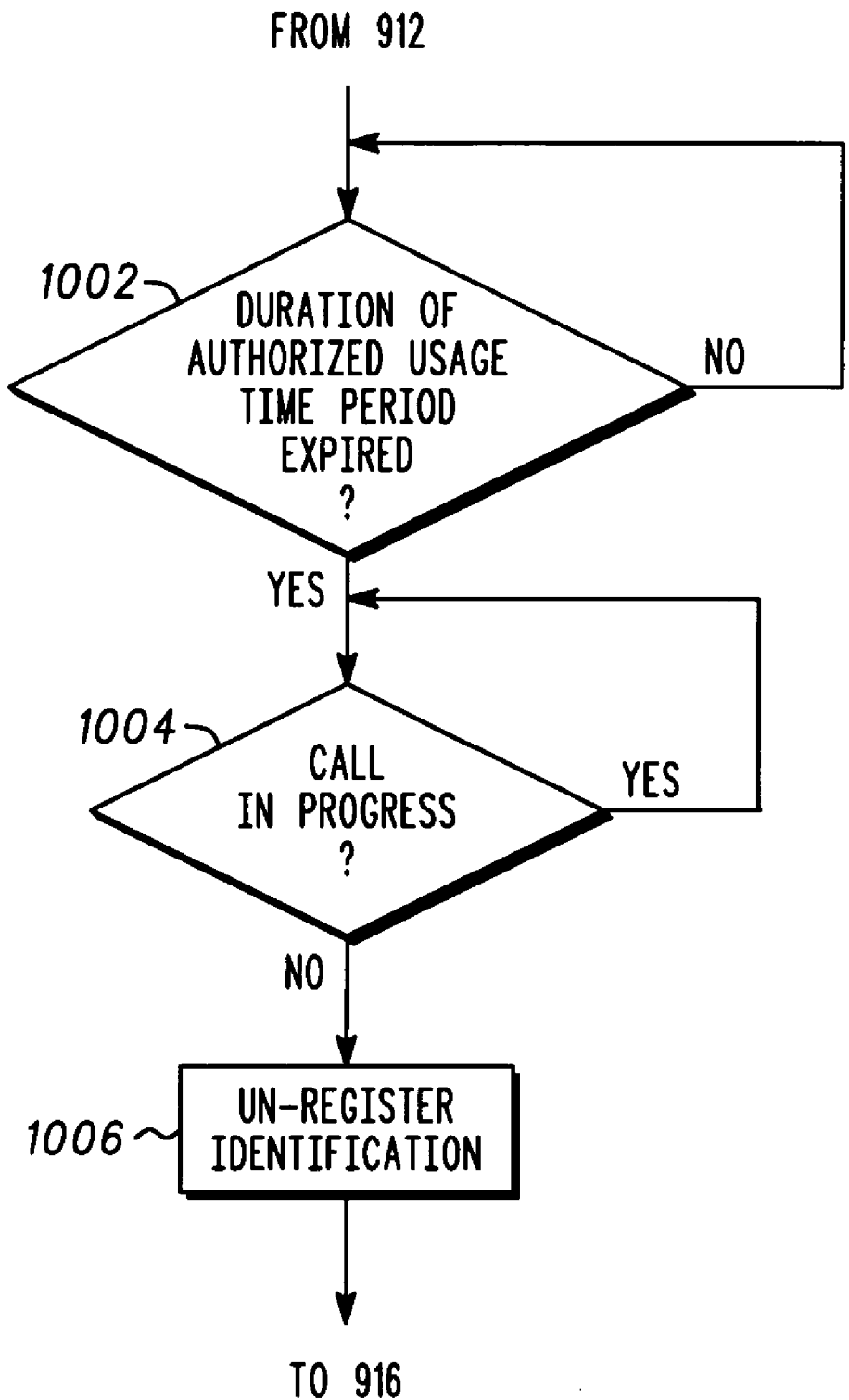
FIG. 10 is an exemplary flowchart for delaying un-registration to avoid an abrupt termination of a call already in progress upon expiration of authorized usage time period.

To avoid abruptly terminating a call already in progress, block 914 may be expanded to include a process of delaying un-registration until the call is terminated as shown in FIG. 10. Before un-registering the wireless mobile communication device 112, the WLAN 102 determines whether the duration of the authorized usage time period has expired in block 1002. If the duration of the authorized usage time period has not yet expired, then the WLAN 102 continues to check for expiration of the duration of the authorized usage time period. If the duration of the authorized usage time period has expired, then the WLAN 102 determines whether the wireless mobile communication device 112 is in a call in block 1004. If the wireless mobile communication device 112 is in a call, then the WLAN 102 continues to monitor the call until it is terminated. When the call is terminated, the WLAN 102 un-registers the identification, or the IP address, of the wireless mobile communication device 112 from the registration in block 1006.

Figure 11:
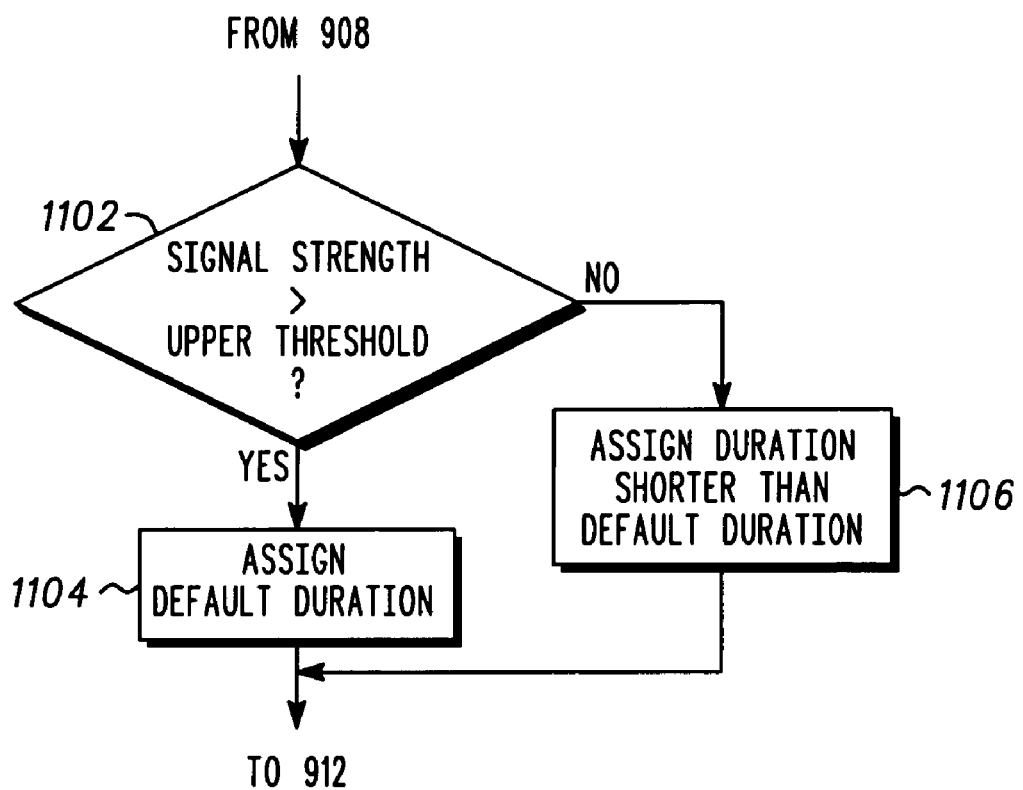
FIG. 11 is an exemplary flowchart further describing determination of the duration of authorized usage time period base upon the signal strength.

FIG. 11 is an exemplary flowchart further describing block 910 for determining the duration of authorized usage time period base upon the signal strength, similar to the method described previously in FIG. 4. In block 1102, the measured signal strength is compared to an upper threshold such as −70 dBm. If the measured signal strength exceeds the upper threshold, then the wireless mobile communication device 112 is likely to be well within the coverage area 202, and a default time period, such as 3600 seconds, is selected in block 1104 to be assigned to the wireless mobile communication device 112. If the measured signal strength fails to exceed the upper threshold, then the duration of authorized usage time period is reduced from the default time period in block 1106. Further, if the measured signal strength is below a lower threshold, then the duration of authorized usage time period may be set to zero and the wireless mobile communication device 112 is not registered. As previously described, the duration of the authorized usage time period can be determined in various ways such as by using the lookup table 500 as shown in FIG. 5, or by using a mathematical relationship as shown in Equation (1).

Figure 12:
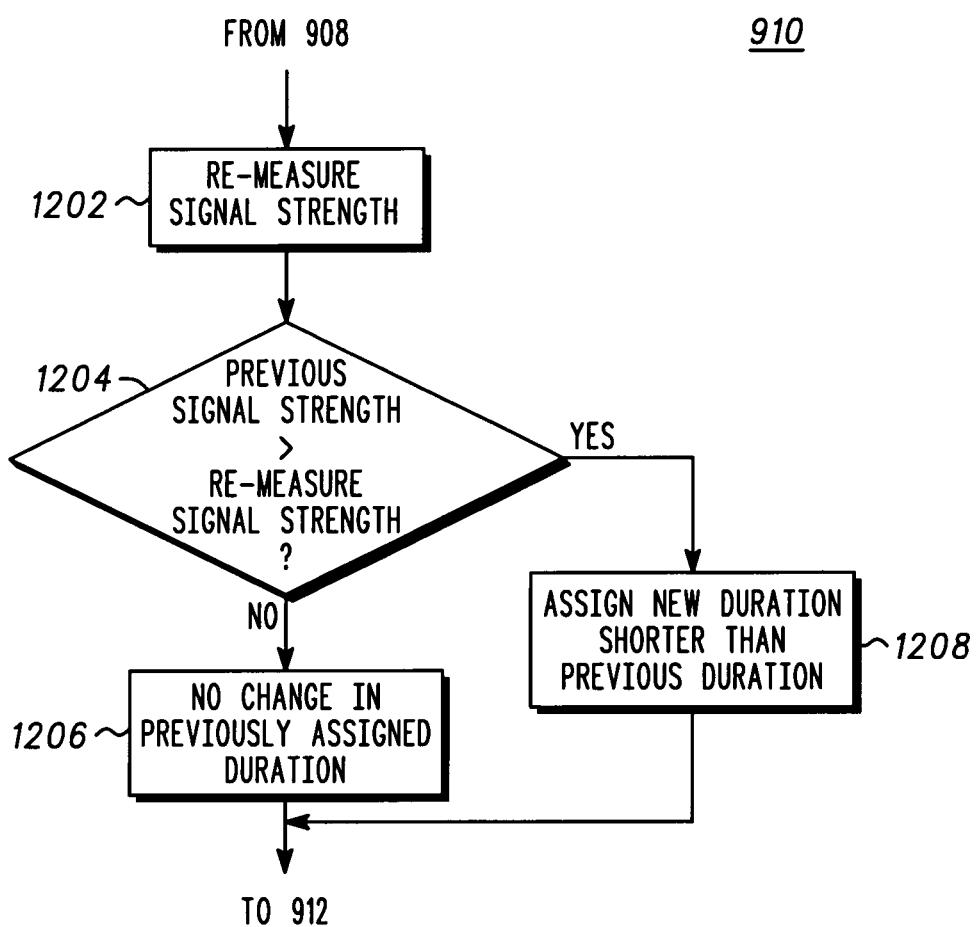
FIG. 12 is an exemplary flowchart describing re-determination of the duration of authorized usage time period base upon the re-measured signal strength.

Similarly to the method described in FIG. 6, the signal strength may also be re-measured during a previously assigned authorized usage period. Based upon the re-measured signal strength, a new duration of the authorized usage time period may be determined and assigned to the identification of the wireless mobile communication device 112. FIG. 12 is an exemplary flowchart describing re-determination of the duration of authorized usage time period base upon the re-measured signal strength. During the duration of authorized period, the WLAN 102 re-measures the signal strength of the wireless mobile communication device 112 in block 1202, and compares the re-measured signal strength to the previously measured signal strength in block 1204. If the re-measured signal strength is not weaker than the previously measured signal strength, then the previously assigned duration of the authorized usage time period is unchanged in block 1206. However if the re-measured signal strength is weaker than the previously measured signal strength, then in block 1208, the WLAN 102 assigns a new duration of authorized usage period to the wireless mobile communication device 112. There may be a minimum required difference in the signal strength, such as 10 dB, to prevent the WLAN 102 from assigning a new duration to the wireless mobile communication device 112 for a small signal strength difference between the re-measured signal strength and the previously measured signal strength. For example, if the wireless mobile communication device 112 is initially assigned the default time period as the authorized usage time period, but before the expiration of the default time period, a re-measured signal strength is weak and indicates that the wireless mobile communication device 112 is now in a fringe area of the coverage area, then the WLAN 102 may assign a new and reduced duration of the authorized usage time period based upon the re-measured signal strength. To facilitate periodic re-measuring of the signal strength, the WLAN 102 may transmit a polling request periodically, receive a return signal in response to the polling request from the wireless mobile communication device 112, and measuring signal strength of the return signal.

Figure 13:
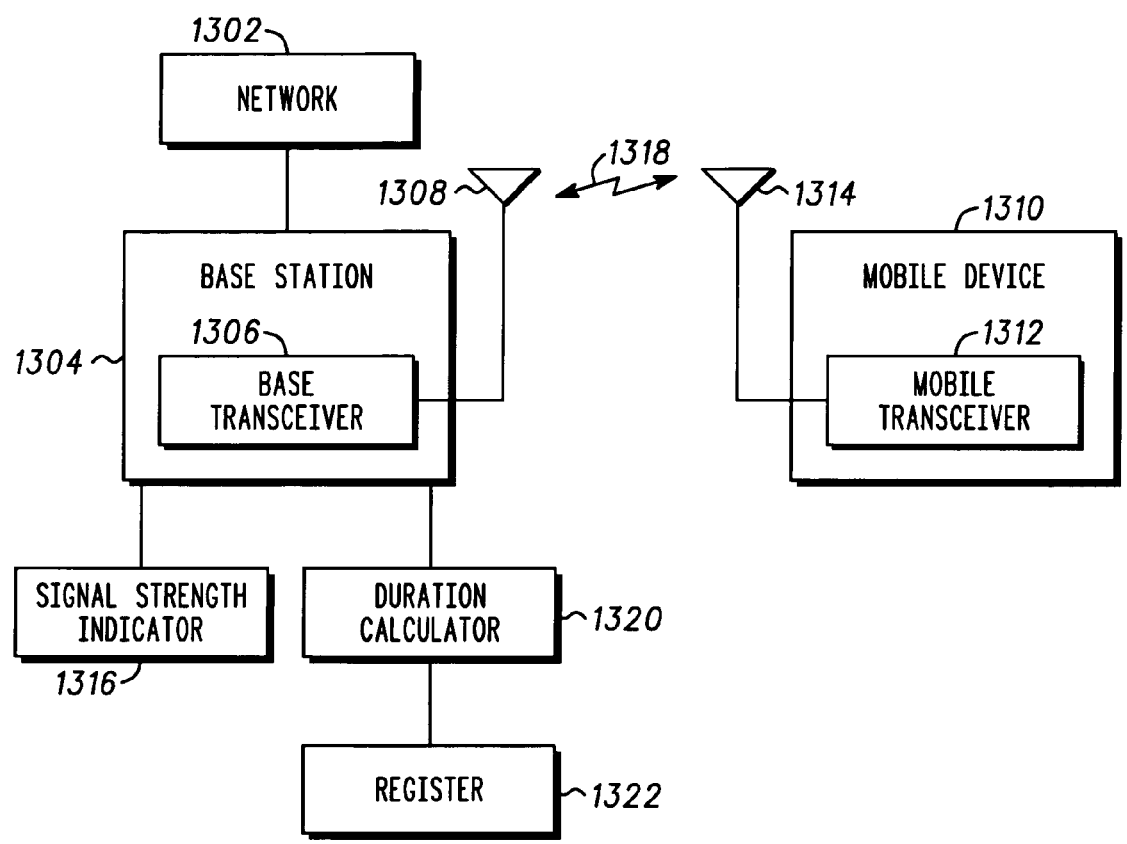
FIG. 13 is an exemplary block diagram of a wireless local area network system capable of assigning variable authorized usage duration in accordance with the present invention.

FIG. 13 is an exemplary block diagram of a WLAN system 1300 capable of assigning variable authorized usage duration in accordance with the present invention. The WLAN system 1300 comprises a local area network 1302, which is configured to connect to various components such as a register server and a location server as previously shown in FIG. 1, and may be capable of communicating to other communication network. A base station 1304 is coupled to the local area network and includes a base transceiver 1306 and a base antenna 1308, and is configured to communicate wirelessly with various wireless mobile communication devices. Within the WLAN system 1300, there is a wireless mobile communication device 1310 coupled to the base station 1304 by wireless communication. The wireless mobile communication device 1310 includes a mobile transceiver 1312 and a mobile antenna 1314, and is configured to wirelessly communicate with the base station 1304. A signal strength indicator 1316 is coupled to at least one of the base station 1304 or the wireless mobile communication device 1310; here the signal strength indicator 1316 is shown as being coupled to the base station 1304. The signal strength indicator 1316 is configured to measure signal strength of a signal 1318 used in wireless communication between the base station 1304 and the wireless mobile communication device 1310. A duration calculator 1320 is coupled to at least one of the base station 1304 or the wireless mobile communication device 1310; here the duration calculator 1320 is shown as being coupled to the base station 1304. The duration calculator is configured to receive measured signal strength information and to calculate duration of the variable authorized usage duration based upon the measured signal strength information. As previously illustrated, the authorized usage duration may be determined mathematically as a function of the measured signal strength, or by using a lookup table. A register 1322 is coupled to the duration calculator 1320, and is configured to maintain registration of the wireless mobile communication device 1310 in the WLAN system 1300 for the variable authorized usage duration.

Various alternative configurations of the WLAN system are possible. For example, the signal strength indicator 1316 may be coupled to the wireless mobile communication device 1310, and may be configured to measure the signal strength of a signal transmitted by the base transceiver 1306. The mobile transceiver 1312 then may transmit to the base station 1306 measured signal strength information to be used by the duration calculator 1320 coupled to the base station 1306. Another example is to have both signal strength indicator 1316 and the duration calculator 1320 coupled to the wireless mobile communication device 1310 such that the signal strength measurement and the duration calculation are both performed at the wireless mobile communication device 1310. The signal strength indicator 1316 can then measure the signal strength of a signal transmitted by the base transceiver 1306, and the duration calculator 1320 can calculate duration of the variable authorized usage duration based upon the measured signal strength information. The mobile transceiver 1312 can then transmit the duration information to the base station 1304.

The present invention focuses on a wireless local area network system, however, it may be used in other system utilizing wireless communication such as, but not limited to, Third Generation Cellular Telephone system, Global System for Mobile, Code Division Multiple Access system, and Time Division Multiple Access, Advanced Mobile Phone System, and Bluetooth system.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a wireless mobile communication device for determining duration of authorized usage time period, the method comprising:

receiving a signal;
measuring signal strength of the signal;
determining the duration of authorized usage time period relative to the measured signal strength; and
requesting registration for the duration of authorized usage time period.

2. The method of claim 1, wherein determining the duration of the authorized usage time period further comprises:
comparing the measured signal strength to a predetermined upper threshold;
setting a predetermined default time period as the duration of authorized usage time period if the measured signal strength exceeds the predetermined upper threshold; and
reducing the duration of authorized usage time period to less than the predetermined default time period if the measured signal strength fails to exceed the predetermined upper threshold.

3. The method of claim 2, wherein the reduced authorized usage time period is proportional to the measured signal strength.

4. The method of claim 1, further comprising:
determining whether the wireless mobile communication device is in a call upon expiration of the duration of authorized usage time period; and
transmitting an expiration delaying request upon determining the wireless mobile communication device is in a call for delaying the expiration of the duration of authorized usage time period until the call is terminated.

5. The method of claim 1, further comprising:
re-measuring the signal strength of the signal; and
re-determining the duration of the authorized usage time period based upon the re-measured signal strength.

6. The method of claim 5, wherein re-measuring the signal strength of the signal includes at least one of:
re-measuring the signal strength of the signal continuously;
re-measuring the signal strength of the signal upon expiration of a previous authorized usage time period; and
re-measuring the signal strength of the signal upon a predetermined re-measuring time interval.

7. The method of claim 6, wherein re-determining the duration of the authorized usage time period based upon the re-measured signal strength includes at least one of:
ending the authorized usage time period based upon the re-measured signal strength failing to exceed a predetermined minimum level; and
ending the authorized usage time period based upon a difference between the re-measured signal strength and a previously measured signal strength.

8. A wireless mobile communication device configured to determine duration of authorized usage time period, the wireless mobile communication device comprising:
a receiver configured to receive a signal;
a signal strength indicator coupled to the receiver, the signal strength indicator configured to measure signal strength of the signal; and
a duration calculator coupled to the signal strength indicator, the duration calculator configured to determine the duration of authorized usage time period relative to based-open the measured signal strength; and
a transmitter coupled to the duration calculator, the transmitter configured to transmit a registration request wherein the registration is valid for the duration of authorized usage time period.

9. The wireless mobile communication device of claim 8, wherein the duration calculator further comprises:
a comparator coupled to the signal strength indicator, the comparator configured to compare the measured signal strength to a predetermined upper threshold,
wherein the duration calculator is further configured to set a predetermined default time period as the duration of authorized usage time period if the measured signal strength exceeds the predetermined upper threshold, and to reduce the duration of authorized usage time period to less than the predetermined default time period if the measured signal strength falls to exceed the predetermined upper threshold.

10. The wireless mobile communication device of claim 8, further comprising:
a call monitor coupled to the duration calculator and to the transmitter, the call monitor configured to determine whether the wireless mobile communication device is in a call upon expiration of the duration of authorized usage time period,
wherein the transmitter is further configured to transmit an expiration delay request designed to delay the expiration of the duration of authorized usage time period until the call is terminated.

11. A method in a wireless local area network for assigning an authorized usage time period, the method comprising:
receiving a signal including a registration request and an identification of a source of the signal;
measuring signal strength of the signal;
determining duration of the authorized usage time period relative to the signal strength;
registering the identification of the source of the signal;
assigning the duration of authorized usage time period to the identification of the source of the signal; and
un-registering the identification of the source of the signal from the registration upon expiration of the duration of authorized usage time period.

12. The method of claim 11, wherein un-registering the identification of the source of the signal from the registration upon expiration of the duration of authorized usage time period further comprises:
determining whether the source associated with the identification is in a call upon the expiration of the duration of authorized usage time period; and
delaying un-registering the identification of the source of the signal from registration until the call is terminated.

13. The method of claim 11, wherein determining the duration of the authorized usage time period further comprises:
comparing the measured signal strength to a predetermined upper threshold;
setting a predetermined default time period as the duration of authorized usage time period if the measured signal strength exceeds the predetermined upper threshold; and
reducing the duration of authorized usage time period to less than the predetermined default time period if the measured signal strength fails to exceed the predetermined upper threshold.

14. The method of claim 13, wherein the reduced authorized usage time period is proportional to the measured signal strength.

15. The method of claim 14, further comprising:
re-measuring the signal strength of the signal;
re-determining the duration of the authorized usage time period based upon the re-measured signal strength; and re-assigning the duration of the authorized usage time period to the identification of the source of the signal.

16. The method of claim 15, wherein re-measuring the signal strength of the signal further comprises:
   transmitting a polling request;
   receiving a return signal in response to the polling request; and
   measuring signal strength of the return signal.

17. The method of claim 16, further comprising:
   ending the authorized usage time period if the re-measured signal strength is less than a predetermined lower threshold.

18. The method of claim 17, wherein ending the authorized usage time period includes setting the duration of authorized usage time period to zero.

19. A method in a wireless local area network for un-registering a wireless mobile communication device currently registered and authorized to operate in the wireless local area network for a pre-assigned usage duration; the method comprising:
   receiving a signal from the wireless mobile communication device;
   measuring signal strength of the signal;
   determining whether the signal strength fails to exceed a minimum threshold;
   ending the pre-assigned usage duration if the signal strength fails to exceed the minimum threshold; and
   assigning a new authorized usage duration, based upon a difference between the measured signal strength and a previously measured signal strength, to the wireless mobile communication device if the signal strength exceeds the minimum threshold.

20. The method of claim 19, wherein the new authorized usage duration is proportional to the measured signal strength.

21. A wireless local area network system configured to assign variable authorized usage duration to a wireless mobile communication device based upon signal strength, the wireless local area network system comprising:
   a local area network;
   a base station coupled to the local area network; the base station including a base transceiver configured to communicate with wireless mobile communication devices by wireless communication;
   a wireless mobile communication device coupled to the base station, the wireless mobile communication device including a mobile transceiver configured to communicate with the base station by the wireless communication;
   a signal strength indicator coupled to at least one of the base station and the wireless mobile communication device, the signal strength indicator configured to measure signal strength of a signal used in the wireless communication between the base station and the wireless mobile communication device;
   a duration calculator coupled to at least one of the base station and the wireless mobile communication device, the duration calculator configured to receive measured signal strength information and to calculate duration of the variable authorized usage duration relative to the measured signal strength information; and
   a register coupled to the duration calculator, the register configured to maintain registration of the wireless mobile communication device in the wireless local area network system for the variable authorized usage duration.

22. The wireless local area network system of claim 21, wherein:
   the signal strength indicator is coupled to the base station, the signal strength indicator configured to measure signal strength of a signal transmitted by the mobile transceiver, and
   the duration calculator is coupled to the base station.

23. The wireless local area network system of claim 21, wherein:
   the signal strength indicator is coupled to the wireless mobile communication device, the signal strength indicator configured to measure signal strength of a signal transmitted by the base transceiver,
   the mobile transceiver is further configured to transmit measured signal strength information to the base station, and
   the duration calculator is coupled to the base station.

24. The wireless local area network system of claim 21, wherein:
   the signal strength indicator is coupled to the wireless mobile communication device, the signal strength indicator configured to measure signal strength of a signal transmitted by the base transceiver,
   the duration calculator is coupled to the wireless mobile communication device, and the mobile transceiver is further configured to transmit the calculate duration of the variable authorized usage duration to the base station.

25. The wireless local area network system of claim 21, wherein the duration calculator further comprises a lookup table including a plurality of correlations between measured signal strength and corresponding duration of the variable authorized usage duration.

* * * * *

UNITED STATES PATENT AND TRADEMARK OFFICE
CERTIFICATE OF CORRECTION

| | | |
|---|---|---|
| PATENT NO. | : 7,043,226 B2 | Page 1 of 1 |
| APPLICATION NO. | : 10/738861 | |
| DATED | : May 9, 2006 | |
| INVENTOR(S) | : Yamauchi | |

It is certified that error appears in the above-identified patent and that said Letters Patent is hereby corrected as shown below:

Claim 8, Column 9, line 63

Delete "based open"

Signed and Sealed this

Twenty-seventh Day of February, 2007

JON W. DUDAS
*Director of the United States Patent and Trademark Office*